(12) United States Patent
Lin et al.

(10) Patent No.: US 12,725,905 B2
(45) Date of Patent: Sep. 1, 2026

(54) ANTENNA STRUCTURE AND HEAD MOUNTED DISPLAY DEVICE

(71) Applicant: HTC Corporation, Taoyuan City (TW)

(72) Inventors: Cheng-Hung Lin, Taoyuan City (TW); Szu-Po Wang, Taoyuan City (TW); Chia-Te Chien, Taoyuan City (TW); Chun-Chieh Wang, Taoyuan City (TW); Kang-Ling Li, Taoyuan City (TW); Chun-Hsien Lee, Taoyuan City (TW); Yu-Chieh Chiu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 482 days.

(21) Appl. No.: 18/302,811

(22) Filed: Apr. 19, 2023

(65) Prior Publication Data

US 2024/0063525 A1 Feb. 22, 2024

Related U.S. Application Data

(60) Provisional application No. 63/399,218, filed on Aug. 19, 2022.

(51) Int. Cl.
*H01Q 1/12* (2006.01)
*G02B 27/01* (2006.01)
(Continued)

(52) U.S. Cl.
CPC ......... *H01Q 1/125* (2013.01); *G02B 27/0176* (2013.01); *G02C 5/14* (2013.01);
(Continued)

(58) Field of Classification Search
CPC .. H01Q 1/44; H01Q 1/36; H01Q 1/22; H01Q 1/276; G02B 27/017; G02B 27/0149
See application file for complete search history.

(56) References Cited

U.S. PATENT DOCUMENTS 7,068,229 B2 6/2006 Lin
10,756,414 B2 8/2020 Ramasamy
(Continued)

FOREIGN PATENT DOCUMENTS

CN 112083573 12/2020
CN 110462926 3/2021

OTHER PUBLICATIONS

Shu-Chuan Chen et al., "An Eight-band WWAN/LTE By-Hinge Printed Inverted-F Antenna on Laptop Computer", 2018 International Symposium on Antennas and Propagation (ISAP), Oct. 2018, pp. 187-188.

(Continued)

*Primary Examiner* — Alexander H Taningco
(74) *Attorney, Agent, or Firm* — JCIPRNET

(57) ABSTRACT

An antenna structure and a head mounted display device are provided. The antenna structure includes a first structure body, a second structure body and a feeding element. The first structure body receives a reference ground voltage. The second structure body is coupled to the first structure body. The second structure body includes a conductive part, a shaft sleeves part and a shaft body, the shaft body passes through the shaft sleeves part, the shaft body is electronically coupled to the conductive part, and the conductive part is coupled to a feed point. The feeding element is coupled to the feed point and the first structure body, and is used for transmitting and receiving a radio frequency signal.

12 Claims, 5 Drawing Sheets

(51) Int. Cl.

| | |
|---|---|
| ***G02C 5/14*** | (2006.01) |
| ***G02C 11/00*** | (2006.01) |
| ***H01Q 1/22*** | (2006.01) |
| ***H01Q 1/38*** | (2006.01) |
| ***H01Q 1/48*** | (2006.01) |

(52) U.S. Cl.

CPC ............... *G02C 11/10* (2013.01); *H01Q 1/22* (2013.01); *H01Q 1/38* (2013.01); *H01Q 1/48* (2013.01); *G02B 2027/0178* (2013.01)

(56) References Cited

U.S. PATENT DOCUMENTS

| | | | | |
|---|---|---|---|---|
| 11,333,905 | B2 | 5/2022 | Zhang et al. | |
| 2006/0071863 | A1 | 4/2006 | Lindell | |
| 2009/0128424 | A1 * | 5/2009 | Suzuki | H01Q 9/30<br>343/702 |
| 2014/0194078 | A1 * | 7/2014 | Hikino | H01Q 9/16<br>455/90.2 |
| 2023/0213771 | A1 * | 7/2023 | Choe | H01Q 1/273<br>345/8 |
| 2023/0231303 | A1 * | 7/2023 | Park | H01Q 9/42<br>343/702 |

OTHER PUBLICATIONS

Jing-Feng Ke et al., "A Dual-Band WLAN Antenna Design for Placement in Hinges of Convertible Notebooks", 2019 Cross Strait Quad-Regional Radio Science and Wireless Technology Conference (CSQRWC), Jul. 2019, pp. 1-2.

"Office Action of Taiwan Counterpart Application", issued on Dec. 25, 2023, p. 1-p. 6.

* cited by examiner

ANTENNA STRUCTURE AND HEAD MOUNTED DISPLAY DEVICE

CROSS-REFERENCE TO RELATED APPLICATION

This application claims the priority benefit of U.S. provisional application Ser. No. 63/399,218, filed on Aug. 19, 2022. The entirety of the above-mentioned patent application is hereby incorporated by reference herein and made a part of this specification.

BACKGROUND

Technical Field

The invention relates to an antenna structure and a head mounted display device, and in particular, to an antenna structure applied to a head-mounted display device and the head-mounted display device with effectively planned antenna structure configuration space.

Description of Related Art

Generally, printed circuit board (PCB) antenna structures have the characteristic of high signal loss. Currently, the hidden antennas in wearable products for virtual reality (VR) and augmented reality (AR) are mostly manufactured using methods such as PCB, flexible printed circuit (FPC), or laser-direct-structuring (LDS) technologies. All of these have dielectric properties that provide a substrate for antenna design and require additional planning for antenna assembly space within the system.

However, there are many factors affecting the design of wearable products in the above-mentioned approach, such as product appearance design, internal structure thickness planning and weight requirements, material properties and excessive accessory generation issues, and the complexity of product assembly processes. Therefore, how to improve the antenna assembly space and system performance of various wearable products for VR and AR is an important issue for technical personnel in this field.

SUMMARY

The invention provides an antenna structure with excellent radiation characteristics.

The invention provides a head-mounted display device, which includes the aforementioned antenna structure.

The antenna structure of the present invention includes a first structure body, a second structure body and a feeding element. The first structure body receives a reference ground voltage. The second structure body is coupled to the first structure body. The second structure body includes a conductive part, a shaft sleeves part and a shaft body, the shaft body passes through the shaft sleeves part, the shaft body is electronically coupled to the conductive part, and the conductive part is coupled to a feed point. The feeding element is coupled to the feed point and the first structure body and is used for transmitting and receiving a radio frequency signal.

The head mounted display device of the present invention includes a main body, two temples, and at least one antenna structure. Two temples are respectively disposed on opposite sides of the main body. The at least one antenna structure is disposed in at least one of the two temples. The antenna structure includes a first structure body, a second structure body and a feeding element. The first structure body receives a reference ground voltage. The second structure body is coupled to the first structure body. The second structure body includes a conductive part, a shaft sleeves part and a shaft body, the shaft body passes through the shaft sleeves part, the shaft body is electronically coupled to the conductive part, and the conductive part is coupled to a feed point. The feeding element is coupled to the feed point and the first structure body and is used for transmitting and receiving a radio frequency signal.

Based on the above, in the head-mounted display device of the present invention, the antenna structure is arranged in the temples to increase the transmission and reception range of the antenna structure. And by using the shaft body as a kind of radiator, the pivoting member and antenna structure are integrated to enhance the strength of the antenna structure and improve the antenna assembly space of wearable products.

Although the present invention has been disclosed in the above embodiments, it is not intended to limit the invention. Those skilled in the art can make minor modifications and refinements without departing from the spirit and scope of the present invention. Therefore, the scope of protection of the present invention shall be defined by the appended claims.

DESCRIPTION OF THE EMBODIMENTS

Figure 1A:
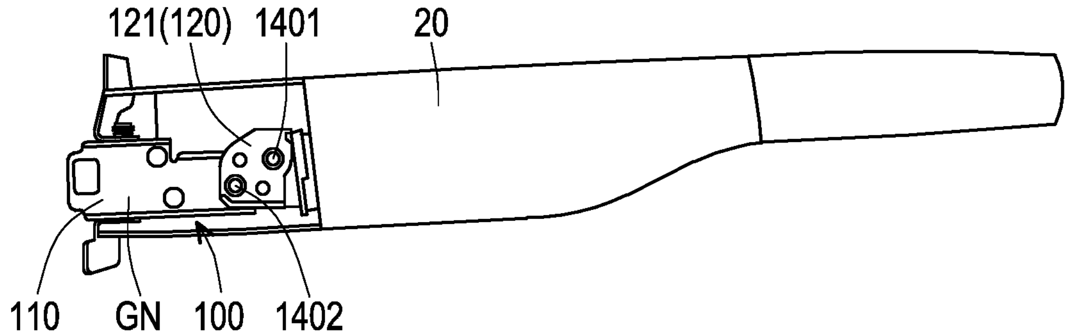
FIG. 1A illustrates a schematic diagram of an antenna structure applied to temples according to an embodiment of the present invention.

FIG. 1A illustrates a schematic diagram of an antenna structure applied to temples according to an embodiment of the present invention. The antenna structure 100 of FIG. 1A is suitable for a head-mounted display device and is configured on a temple 20 of the head-mounted display device. The antenna structure 100 includes a first structure body 110 and a second structure body 120. The first structure body 110 is a conductive structure and receives a reference ground voltage. The second structure body 120 is coupled to the first structure body 110 and serves as a signal feed-in part of the antenna structure 100. The implementation details of the second structure body 120 can refer to the description of FIG. 1B.

Figure 1B:
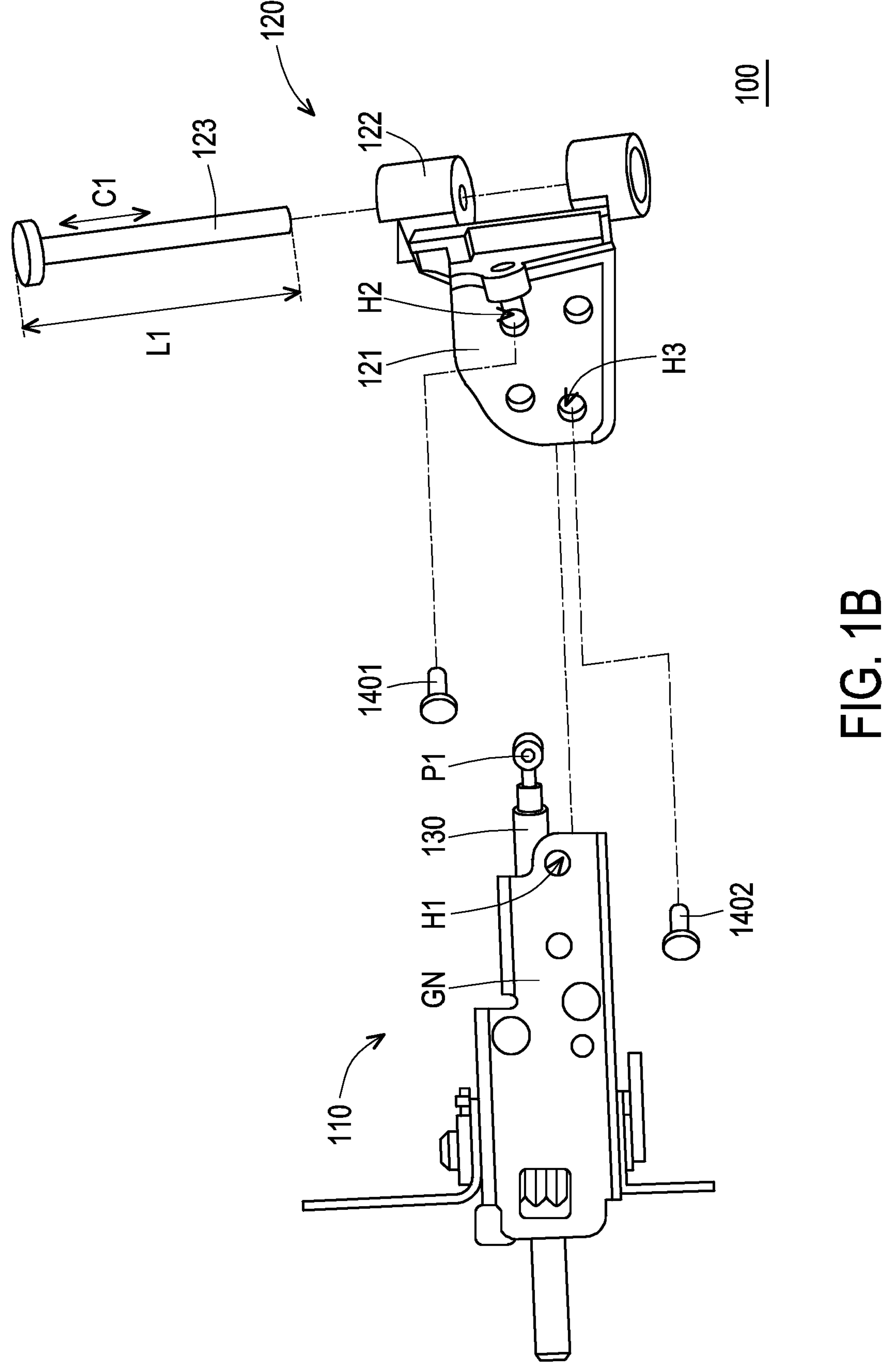
FIG. 1B illustrates an exploded view of the antenna structure in FIG. 1A.

FIG. 1B illustrates an exploded view of the antenna structure in FIG. 1A. In the embodiment, the second structure body 120 includes a conductive part 121, a shaft sleeves part 122, and a shaft body 123. The shaft body 123 passes through the shaft sleeves part 122. Specifically, the shaft sleeves part 122 and the shaft body 123 are both conductors.

The shaft body 123 is electrically coupled to the conductive part 121, and the conductive part 121 can be coupled to a feed point P1. In the embodiment, the shaft body 123 is, for example, a plug structure or a screw structure, but the present invention is not limited thereto.

In the embodiment, the antenna structure 100 further includes a feeding element 130, which is coupled to the feed point P1 and the first structure body 110 and is used for transmitting and receiving a radio frequency signal. Herein, the feeding element 130 is, for example, a coaxial cable, but the present invention is not limited thereto. Accordingly, using the shaft body 123 as a radiator, the shaft body 123 can be integrated into the antenna structure 100 as a pivoting member. In this way, the flexibility of assembly and application of the antenna structure 100 can be improved, and the strength of the antenna material can be improved through the physical strength of the shaft body 123 itself.

In the embodiment, the shaft body 123 has an axial direction C1, and the length of the shaft body 123 along the axial direction C1 can be ½ or ¼ of the wavelength of the radio frequency signal. In this way, the length L1 of the shaft body 123 can be adjusted according to actual needs, so as to control the wavelength of the transmitted and received radio frequency signal. It is worth mentioning that the antenna structure 100 of the embodiment can be applied to ISM band (BT/Wi-Fi) antennas, with its frequency bands mainly being 2.4 GHz/5 GHz dual-band, and it can also be used for the spectrum specifications of the fifth-generation mobile communication frequency band (5G New Radio). Therefore, the effective design wavelength range in the spectrum is from 1710 million hertz (MHz) to 7125 million hertz (MHz).

In details, the antenna structure 100 further includes at least one first connector 1401 and at least one second connector 1402. For example, in the embodiment, the first connector 1401 and the second connector 1402 can be screws, and the antenna structure 100 can use the first connector 1401 and the second connector 1402 to lock the first structure body 110 and the second structure body 120 to each other. In other embodiments, the way of fixing the first structure body 110 and the second structure body 120 may be clamping, welding or adhesion, and the present invention is not limited thereto.

In the embodiment, the first structure body 110 has at least one first perforation H1, the second structure body 120 has at least one second perforation H2 coupled to the feed point P1 and at least one third perforation H3 coupled to a ground plane GN of the first structure body 110.

In the embodiment, the first connector 1401 passes through the second perforation H2 to make the second structure body 120 and the feeding element 130 electrically connected. The second connector 1402 passes through the third perforation H3 and the first perforation H1 to make the second structure body 120 and the ground plane electrically connected. In other embodiment, the number of the connectors and the perforations can be adjusted accordingly according to actual manufacturing process requirements, and the present invention is not limited thereto.

The following will list other embodiments as illustrations. It should be noted that the below embodiments adopt the component numbers and some content of the aforementioned embodiments, using the same numbers to indicate identical or similar components, and omitting descriptions of the same technical content. For explanations of the omitted parts, please refer to the aforementioned embodiments. The following embodiments will not repeat these details redundantly.

Figure 2:
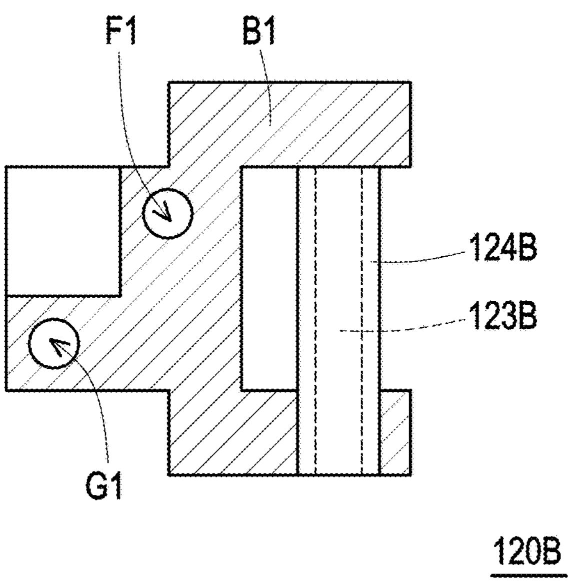
FIG. 2 illustrates a schematic plan view of the second component of the antenna structure in an embodiment of the present invention.

FIG. 2 illustrates a schematic plan view of the second component of the antenna structure in an embodiment of the present invention. FIG. 2 illustrates a conductive path B1 on the second structure body 120B, and the shaft body 123B can contact the conductive path B1 to form electrical conduction. Among them, the position F1 on the conductive path B1 can be used as a signal feed-in point, and the position G1 can be used as a grounding point. In other embodiments, the conductive path, and the position of the feed-in point and the grounding point on the second structure body can be adjusted accordingly according to the requirements of the actual manufacturing process, and the present invention is not limited thereto.

In the embodiment, the shaft body 123B can be surrounded by the plastic part 124B, and only exposes the contact part electrically connected with the conductive path B1, so as to prevent the shaft body 123B made of metal from being interfered by other metal components and affecting the transmission and reception effect.

Figure 3:
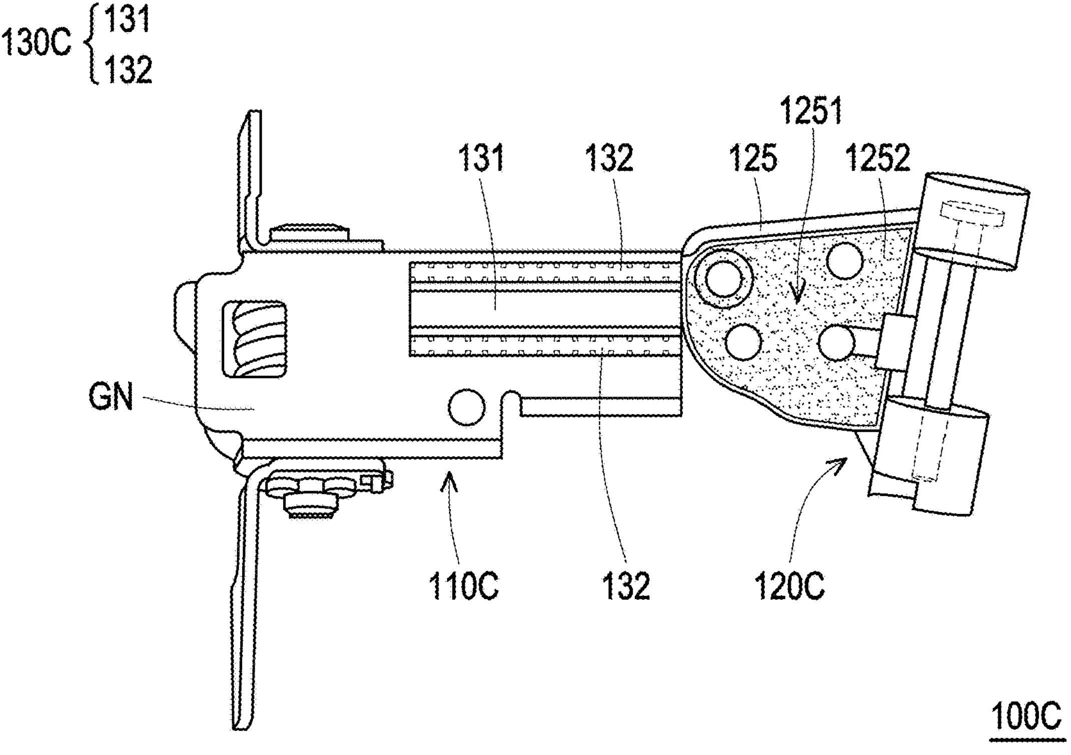
FIG. 3 illustrates a schematic diagram of the antenna structure in an embodiment of the present invention.

FIG. 3 illustrates a schematic diagram of the antenna structure in an embodiment of the present invention. The second structure body 120C of the antenna structure 100C of FIG. 3 has a polygonal substrate 125, and a conductive pattern 1252 is formed on a surface 1251 of the polygonal substrate 125. The polygonal substrate 125 is, for example, an adapter plate, and the surface 1251 is, for example, a plane.

In the embodiment, the feeding element 130C coupled to the first structure body 110C includes a signal transmission line 131 and a plurality of reference signal lines 132. The signal transmission line 131 is used for transmitting and receiving the radio frequency signal. The signal transmission line 131 is disposed between the reference signal lines 132, wherein the reference signal lines 132 can be coupled to the ground voltage.

Figure 4:
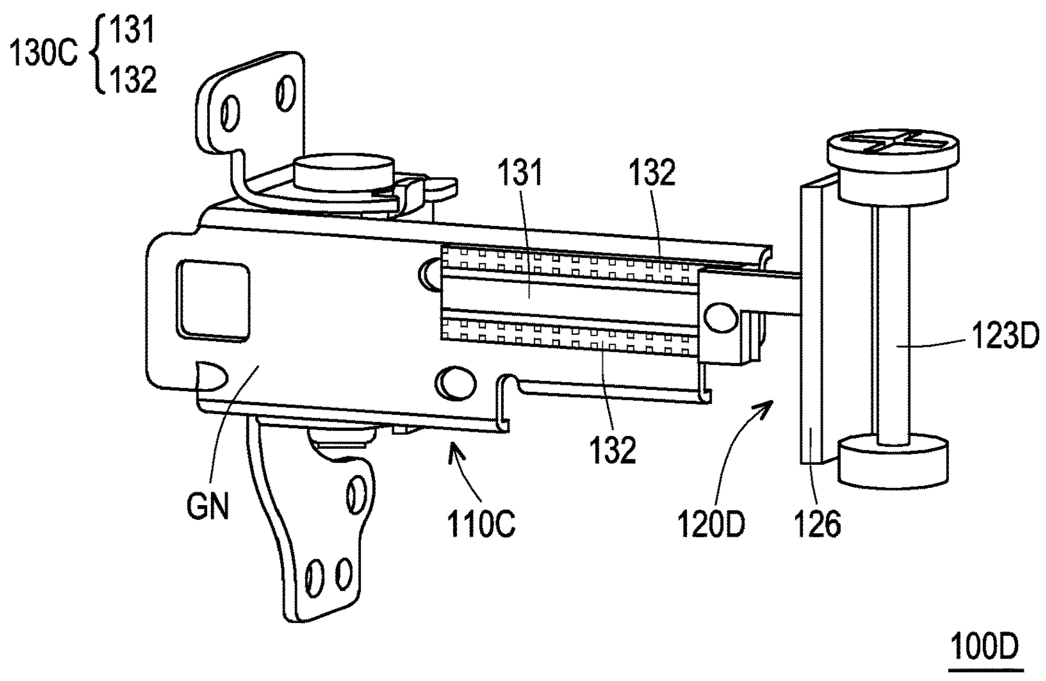
FIG. 4 illustrates a schematic diagram of the antenna structure in an embodiment of the present invention.

FIG. 4 illustrates a schematic diagram of the antenna structure in an embodiment of the present invention. The antenna structure 100D of FIG. 4 is slightly different from the antenna structure 100C of FIG. 3. The main difference is: the second structure body 120D is a conductive structure 126. Specifically, the entire conductive structure 126 can be a conductor, and the shaft body 123D is electrically connected to the conductive structure 126 and electrically coupled to the first structure body 110C.

Figure 5:
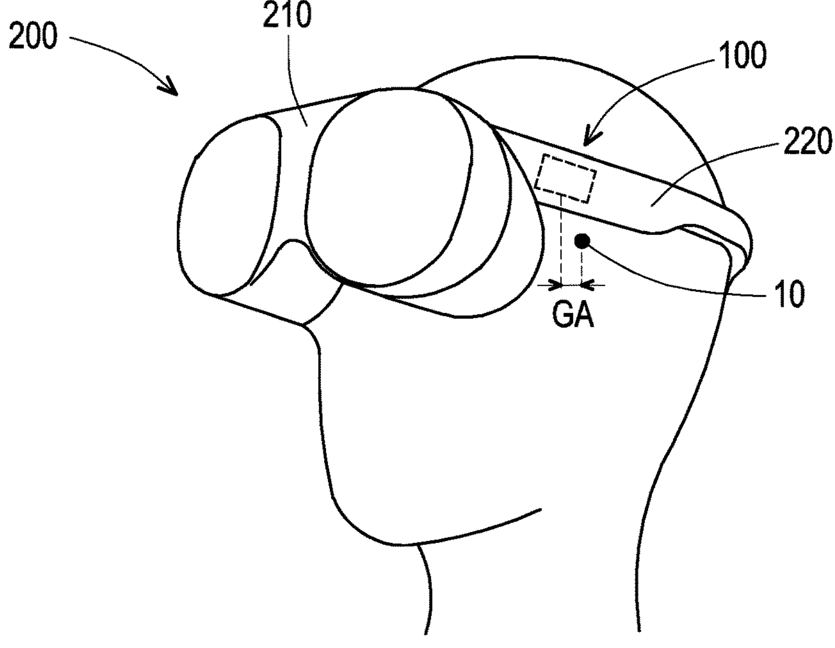
FIG. 5 illustrates a schematic diagram of the head-mounted display device in an embodiment of the present invention.

FIG. 5 illustrates a schematic diagram of a head-mounted display device in an embodiment of the present invention. Referring to FIG. 5, the head-mounted display device 200 includes a main body 210, two temples 220, and at least one antenna structure 100 (its position is schematically shown with a dotted line). Two temples 220 are arranged on two opposite sides of the main body 210 respectively. The antenna structure 100 is disposed in at least one of the two temples 220. In the embodiment, the head-mounted display device 200 is, for example, a wearable product such as virtual reality or augmented reality. In the embodiment, the axis of the front-folding structure (pivoting element) of the temples 220 is used, and metal screws are used as radiators, so that the antenna design structure can be extended to the axis of the folding structure of the temples 220.

In an embodiment, the number of the antenna structure 100 can be two, disposed in the two temples 220 respectively to achieve miniaturized hidden antenna function. In this way, by disposing two antenna structures 100 in two temples 220 respectively, avoiding the influence of the component layout of the communication system to solve the mutual coupling effect between antennas and components, thereby reducing mutual interference of multiple antennas and improving antenna performance.

As shown in FIG. 5, there can be a gap GA between the antenna structure 100 and the position point 10 representing the human face. By adjusting the size of the gap GA, the antenna structure 100 can comply with the stringent standards for Specific Absorption Rate (SAR) of electromagnetic waves in human bodies specified in the regulations of Federal Communications Commission (FCC) in the United States and Conformite Europeenne (CE).

Furthermore, the head-mounted display device 200 of the embodiment effectively integrates the antenna structure 100 with the temple 220 and complies with the Carbon Border Adjustment Mechanism (CBAM) of recent European Union regulations. Therefore, the greenhouse gas emissions directly and indirectly generated by the product during the entire life cycle can be reduced, and the additional system cost of the product can be reduced.

Figure 6:
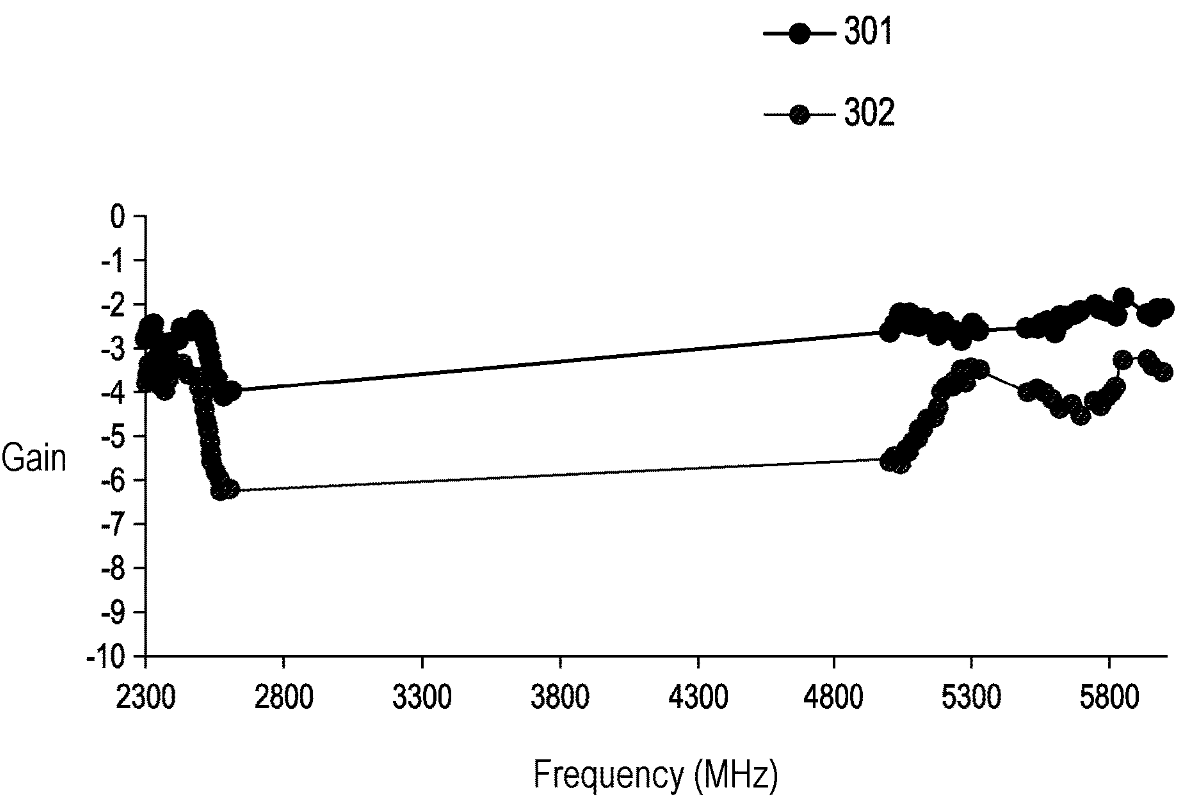
FIG. 6 illustrates a frequency response diagram of the antenna structure in an embodiment of the present invention.

FIG. 6 illustrates a frequency response diagram of the antenna structure in an embodiment of the present invention. Referring to FIG. 6, the illustrated example 301 refers to the frequency response of the antenna structure of the present invention, and the illustrated example 302 refers to the frequency response of the antenna structure on the traditional printed circuit board (PCB). According to the above experiments, it can be known that the response of the antenna structure of the present invention is better than that of the traditional antenna structure on the PCB, has good radiation characteristics, and effectively overcomes the problem of high signal loss of the PCB antenna structure.

In summary, in the head-mounted display device of the present invention, the transmitting and receiving range of the antenna structure is increased by disposing the antenna structure on the temples. In addition, by using the shaft body as a radiator, the shaft body as a pivoting member can be integrated into the antenna structure to improve its assembly and application flexibility. Furthermore, the space configuration in which the antenna structure is assembled in the head-mounted display device is effectively utilized.

Although the present invention has been disclosed in the above embodiments, it is not intended to limit the invention. Those skilled in the art can make minor modifications and refinements without departing from the spirit and scope of the present invention. Therefore, the scope of protection of the present invention shall be defined by the appended claims.

What is claimed is:

1. An antenna structure, comprising:

a first structure body, receiving a reference ground voltage;

a second structure body, coupled to the first structure body, the second structure body comprises a conductive part, a shaft sleeves part and a shaft body, the shaft body passes through the shaft sleeves part, the shaft body, as a radiator, is electronically coupled to the conductive part, and the conductive part is coupled to a feed point; and a feeding element, coupled to the feed point and the first structure body, and is used for transmitting and receiving a radio frequency signal, wherein the shaft body has an axial direction, and the length of the shaft body along the axial direction is ½ or ¼ of the wavelength of the radio frequency signal.

2. The antenna structure according to claim 1, further comprises at least one first connector and at least one second connector, the first structure body has at least one first perforation, the second structure body has at least one second perforation coupled to the feed point and at least one third perforation coupled to a ground plane of the first structure body, the first connector passes through the second perforation to make the second structure body and the feeding element electrically connected, the second connector passes through the third perforation and the first perforation to make the second structure body and the ground plane electrically connected.

3. The antenna structure according to claim 1, wherein the second structure body has a polygonal substrate, and a conductive pattern is formed on a surface of the polygonal substrate.

4. The antenna structure according to claim 1, wherein the second structure body is a conductive structure.

5. The antenna structure according to claim 1, wherein the feeding element comprises:

a signal transmission line, transmitting and receiving the radio frequency signal; and a plurality of reference signal lines, wherein the signal transmission line is disposed between the reference signal lines.

6. The antenna structure according to claim 1, wherein the shaft sleeves part and the shaft body are conductors.

7. A head mounted display device, comprising:

a main body;

two temples, respectively disposed on opposite sides of the main body; and at least one antenna structure, disposed in at least one of the two temples, and comprises:

a first structure body, receiving a reference ground voltage;

a second structure body, coupled to the first structure body, the second structure body comprises a conductive part, a shaft sleeves part and a shaft body, the shaft body passes through the shaft sleeves part, the shaft body, as a radiator, is electronically coupled to the conductive part, and the conductive part is coupled to a feed point; and a feeding element, coupled to the feed point and the first structure body, and is used for transmitting and receiving a radio frequency signal, wherein the shaft body has an axial direction, and the length of the shaft body along the axial direction is ½ or ¼ of the wavelength of the radio frequency signal.

8. The head mounted display device according to claim 7, further comprises at least one first connector and at least one second connector, the first structure body has at least one first perforation, the second structure body has at least one second perforation coupled to the feed point and at least one third perforation coupled to a ground plane of the first structure body, the first connector passes through the second perforation to make the second structure body and the feeding element electrically connected, the second connector passes through the third perforation and the first perforation to make the second structure body and the ground plane electrically connected.

9. The head mounted display device according to claim 7, wherein the second structure body has a polygonal substrate, and a conductive pattern is formed on a surface of the polygonal substrate.

10. The head mounted display device according to claim 7, wherein the second structure body is a conductive structure.

11. The head mounted display device according to claim 7, wherein the feeding element comprises:

a signal transmission line, transmitting and receiving the radio frequency signal; and a plurality of reference signal lines, wherein the signal transmission line is disposed between the reference signal lines.

12. The head mounted display device according to claim 7, wherein the shaft sleeves part and the shaft body are conductors.

* * * * *